(12) United States Patent
Heap et al.

(10) Patent No.: US 8,935,027 B2
(45) Date of Patent: Jan. 13, 2015

(54) METHOD AND APPARATUS TO EFFECT CATALYST LIGHT-OFF IN A MULTI-MODE POWERTRAIN SYSTEM

(75) Inventors: Anthony H. Heap, Ann Arbor, MI (US); Kee Yong Kim, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 13/568,029

(22) Filed: Aug. 6, 2012

(65) Prior Publication Data
US 2014/0039736 A1 Feb. 6, 2014

(51) Int. Cl.
B60K 17/06 (2006.01)

(52) U.S. Cl.
USPC ............................................. 701/22; 701/54

(58) Field of Classification Search
USPC ..................................................... 701/22, 54
See application file for complete search history.

(56) References Cited

U.S. PATENT DOCUMENTS

| 7,546,761 B2 | 6/2009 | He et al. |
| 7,645,206 B2 | 1/2010 | Holmes et al. |
| 2009/0118091 A1* | 5/2009 | Lahti et al. .................... 477/100 |
| 2010/0179009 A1 | 7/2010 | Wittkopp et al. |

* cited by examiner

Primary Examiner — Mary Cheung
Assistant Examiner — Yuen Wong

(57) ABSTRACT

A multi-mode vehicular powertrain system includes an internal combustion engine fluidly coupled to an exhaust aftertreatment system including a catalytic device and an electric machine electrically coupled to a battery. A method for effecting light-off of the catalytic device includes monitoring an output torque request for the powertrain system and determining a preferred engine operating point having a minimum engine operating cost within a predetermined engine operating region for catalyst light-off. When a state-of-charge of the battery is not approaching a predetermined state-of-charge limit, operation of the engine is controlled to the preferred engine operating point and operation of the electric machine is controlled to a machine operating point wherein the combination of engine torque at the preferred engine operating point and electric machine torque at the machine operating point satisfies the output torque request.

8 Claims, 4 Drawing Sheets

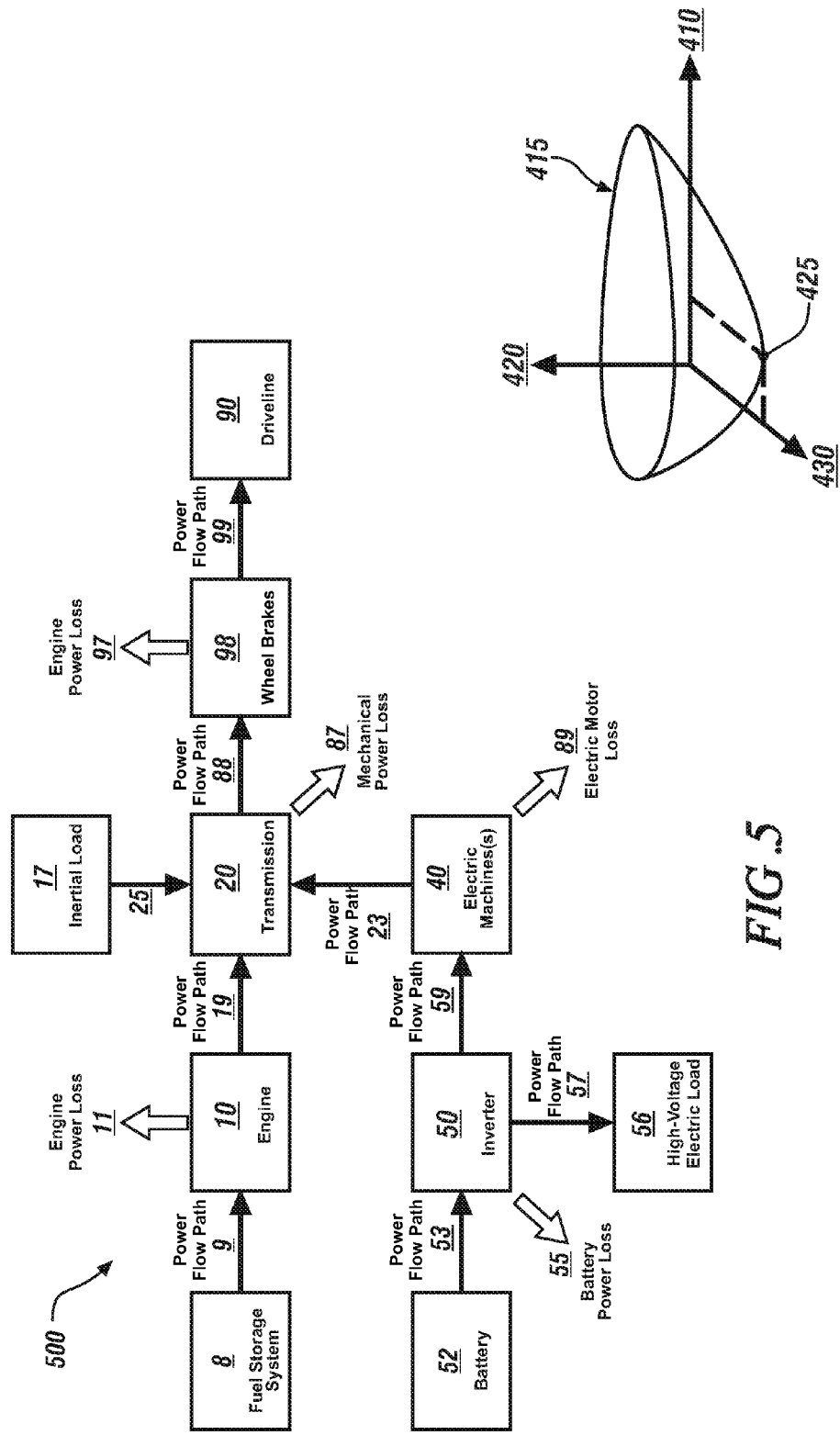

METHOD AND APPARATUS TO EFFECT CATALYST LIGHT-OFF IN A MULTI-MODE POWERTRAIN SYSTEM

TECHNICAL FIELD

This disclosure is related to multi-mode powertrain systems, and control systems for exhaust aftertreatment.

BACKGROUND

The statements in this section merely provide background information related to the present disclosure. Accordingly, such statements are not intended to constitute an admission of prior art.

Multi-mode powertrain systems employ internal combustion engine and non-combustion torque machines to generate driveline torque in response to an output torque command from an operator, taking into account fuel consumption, power consumption, torque management, auxiliary power demands, emissions, driveability, and other factors.

Exhaust aftertreatment systems are employed on internal combustion engines to treat engine exhaust emissions including HC, CO, NOx, particulate matter, and other gas constituents. This includes devices that are configured to oxidize, reduce, reform, filter, and otherwise transform exhaust gas constituents to elemental nitrogen, carbon, $CO_2$, $H_2O$, and other molecules in the presence of catalysts and other constituents.

Exhaust aftertreatment devices include catalytic devices that are configured to perform one or more of the aforementioned processes on constituents in the exhaust gas feedstream. Known catalytic devices are characterized in terms of gas conversion rate in relation to operating temperature. Catalyst light-off temperature refers to a temperature at which the catalytic device has a conversion rate of 50%. The catalyst light-off temperature correlates to operation of the catalyst which is exothermic in nature and is thus self-sustaining without need for additional engine control operation to introduce heat.

A control architecture is an arrangement of input signals, actuator commands and control modules that is configured to execute delegated tasks to determine operational commands for actuators of a system to achieve a desired output in response to operator inputs and commands. The delegated tasks are preferably achieved using control routines that are executed to provide the desired functions.

SUMMARY

A multi-mode vehicular powertrain system includes an internal combustion engine fluidly coupled to an exhaust aftertreatment system including a catalytic device and an electric machine electrically coupled to a battery. A method for effecting light-off of the catalytic device includes monitoring an output torque request for the powertrain system and determining a preferred engine operating point having a minimum engine operating cost within a predetermined engine operating region for catalyst light-off. When a state-of-charge of the battery is not approaching a predetermined state-of-charge limit, operation of the engine is controlled to the preferred engine operating point and operation of the electric machine is controlled to a machine operating point wherein the combination of engine torque at the preferred engine operating point and electric machine torque at the machine operating point satisfies the output torque request.

BRIEF DESCRIPTION OF THE DRAWINGS

One or more embodiments will now be described, by way of example, with reference to the accompanying drawings, in which:

FIGS. 3-1, 3-2, and 3-3 graphically show an engine operating region for catalyst light-off and associated engine operating costs to effect catalyst light-off in relation to engine operating costs, in accordance with the disclosure;

FIG. 4 graphically illustrates a total power cost function for an exemplary multi-mode powertrain system, in accordance with the disclosure; and FIG. 5 schematically illustrates an analytic framework for determining powertrain system operating costs for an exemplary power cost function that is described with reference to the multi-mode powertrain system of FIG. 1, in accordance with the disclosure.

DETAILED DESCRIPTION

Figure 1:
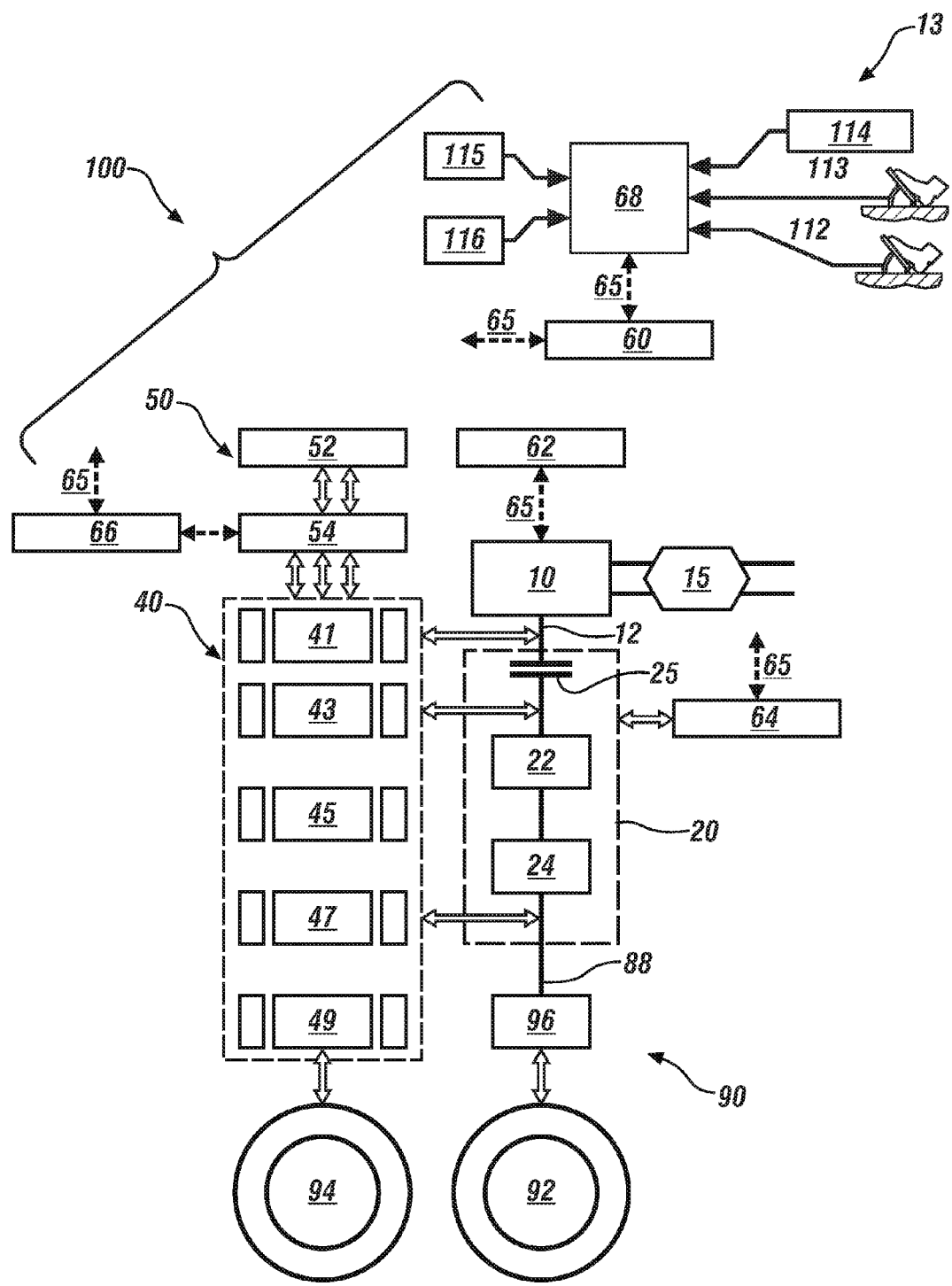
FIG. 1 illustrates a multi-mode powertrain system employing a power-split configuration including an internal combustion engine fluidly coupled to an exhaust aftertreatment system including a catalytic device, non-combustion torque machine(s), a transmission, a non-combustion power system, a driveline, and a controller, in accordance with the disclosure.

Referring now to the drawings, wherein the showings are for the purpose of illustrating certain exemplary embodiments only and not for the purpose of limiting the same, FIG. 1 depicts an exemplary multi-mode powertrain system 100. A multi-mode powertrain system is a powertrain system that is configured and controlled to transfer tractive torque generated by multiple torque actuators to a driveline to effect propulsion. Torque actuators preferably include an internal combustion engine and one or more non-combustion torque machine(s). In one embodiment, the powertrain system 100 employs a power-split configuration including an internal combustion engine 10, non-combustion torque machine(s) 40, transmission 20, a non-combustion power system 50, a driveline 90, and a control system including controller 60. In one embodiment the torque machine(s) 40 is an electric motor/generator and the non-combustion power system 50 is a high-voltage electrical system. Alternate non-combustion power systems may be employed with similar effect, with non-combustion power systems including, e.g., pneumatic power systems, hydraulic power systems, and mechanical power systems.

FIG. 1 shows alternate arrangements for the powertrain system 100 employing the internal combustion engine 10 and torque machine(s) 40 as propulsion devices, with the engine 10 and torque machine(s) 40 configured to transfer torque to the transmission 20 coupled to output member 88 to provide tractive torque to the driveline 90. The non-combustion torque machine(s) 40 include selected one(s) of torque machines 41, 43, 45, 47 and 49. The driveline 90 includes primary drive wheels 92 that mechanically couple via differential gearing 96 or a transaxle or another suitable device to the output member 88 of the transmission 20 to generate tractive torque. The driveline 90 includes secondary drive wheels 94 that may couple to one of the torque machine(s) 40, e.g., torque machine 49 as shown, to generate tractive torque in one embodiment.

The engine 10 can be either a spark-ignition or a compression-ignition engine, or another suitable combustion device, and includes a multi-cylinder internal combustion engine operative in several states to generate and transfer torque to the transmission 20 via input member 12. The input member 12 mechanically couples to the transmission 20 preferably via an interface device 25, which can be a torque converter or a clutch device. An engine control module (ECM) 62 is configured to control operation of the engine 10. The engine 10 is configured to execute fuel cutoff, autostop and autostart operations during ongoing powertrain operation in response to operating conditions. Engine autostop is a process wherein the engine 10 goes from an engine-on state to an engine-off state during ongoing powertrain operation. Engine autostart is a process wherein the engine 10 goes from an engine-off state to an engine-on state during ongoing powertrain operation. Engine-off operation is an engine operating state wherein the engine crankshaft, which is rotatably coupled to the input member 12, is not rotating and the engine 10 is unfueled. Engine-on operation is an engine operating state wherein the engine crankshaft is rotating and the engine is fueled and firing, thus producing torque. Engine fuel cutoff is an engine operating state wherein the engine crankshaft is rotating but is unfueled. Engine output including speed and torque can be controlled by controlling actuators to control combustion parameters including intake mass airflow (including intake air pressure on engines so equipped), fuel mass and injection timing, spark-ignition timing (on engines so equipped), EGR, and intake and/or exhaust valve timing and phasing (on engines so equipped).

An exhaust aftertreatment system including one or more catalytic devices 15 is fluidly coupled to an output of the engine 10 to treat exhaust gases flowing from the engine 10. The catalytic devices 15 can include an oxidation catalyst, an oxidation-reduction catalyst (often referred to as a three-way catalyst), a NOx reduction catalyst, a particulate filter, a selective catalyst reduction device, or another suitable exhaust aftertreatment element without limitation. The aforementioned catalytic devices 15 act to reduce exhaust gas constituents including HC, CO, NOx, particulate matter, aldehydes, and other constituents to elemental nitrogen, carbon, $CO_2$, $H_2O$, and other molecules in the presence of catalysts and other constituents at elevated temperature conditions.

The transmission 20 mechanically couples to the engine 10 and the torque machine(s) 40 and is configured to transfer torque among the engine 10, the torque machine(s) 40, and the driveline 90. The transmission 20 includes one or more of differential gears, shafts, belts, clutches and other elements to transfer torque between the input member 12 and an output member 18. In one embodiment, the transmission 20 is a fixed-ratio mechanical device having a single input member 12 and a single output member 18 and differential gears 22 and 24, and is configured to transfer torque among the engine 10, the torque machine(s) 40, and the driveline 90 in one of a plurality of fixed-gear states. Thus, one or more of the torque machine(s) 40 is rotatably coupled to either the input member or the output member for transfer torque. Each fixed-gear state includes a ratio of transmission input speed to transmission output speed. Fixed-gear ratios have graduated step increases from a relatively small value to a large value with increasing fixed-gear state from a low gear to a higher gear, including an overdrive state(s) wherein the transmission output speed is greater than the transmission input speed. The transmission 20 may be configured as an automatic transmission to automatically shift between the fixed-gear ratio states using a predetermined control scheme. Alternatively, the transmission 20 may be configured as a manual transmission to manually shift between the fixed-gear ratio states in response to an operator-initiated shift request that may include manipulation of a shift lever and a clutch pedal. Alternatively, the transmission 20 may be configured to operate in either of a fixed-gear mode and a continuously-variable mode, with operation in the continuously variable mode including transferring torque among the engine 10, the torque machine(s) 40, and the driveline 90 in a continuously variable ratio that is controllable, with the transferred torque employed for tractive effort and electric power generation. A transmission control module (TCM) 64 is configured to control operation of the transmission 20.

The powertrain system 100 may employ one or more of the torque machines 41, 43, 45, 47 and 49. The torque machines 41, 43, 45, 47 and 49 each preferably includes a multi-phase AC motor/generator including a stator and a rotor that employ electric energy to generate and react torque. The first torque machine 41 mechanically couples to and turns with a crankshaft of the engine 10 in embodiments wherein it is employed. The mechanical coupling may include a belt drive coupling (BAS) or a direct drive coupling (FAS). The second torque machine 43 mechanically couples to and turns with the input member 12 of the transmission 20, including coupling to a gear member of a differential gear set thereof in embodiments wherein it is employed. The third torque machine 45 mechanically couples to and turns with the input member 12 via differential gear set 22 and mechanically couples to and turns with the output member 88 via differential gear set 24 in embodiments wherein it is employed. The fourth torque machine 47 mechanically couples to and turns with the output member 88 of the transmission 20, including coupling to a gear member of differential gear set 24 in embodiments wherein it is employed. The fifth torque machine 49 mechanically couples to and turns with the secondary drive wheels 94 in embodiments wherein it is employed. The powertrain system 100 may employ an individual one of the torque machine(s) 40, i.e., one of the torque machines 41, 43, 45, 47 and 49. In one embodiment, the first torque machine 41 is employed. The powertrain system 100 may employ combinations of the torque machine(s) 40, i.e., combinations of the torque machines 41, 43, 45, 47 and 49. In one embodiment, the first torque machine 41 is employed in combination with the second torque machine 43. In one embodiment, the first torque machine 41 is employed in combination with the fourth torque machine 49. Other suitable combinations may be employed without limitation.

The high-voltage electrical system 50 includes a high-voltage electrical energy storage device (battery) 52 electrically coupled to an inverter 54 via a high-voltage bus. A battery pack control module couples to the battery 52 to monitor operation thereof. The high-voltage electrical energy storage device 52 is referred to herein as a battery, but may be any suitable high-voltage electrical energy storage device. An inverter module 66 operatively connects to the inverter 54 to control operation thereof, and thus control operation of the selected one(s) of the torque machines 41, 43, 45, 47 and 49. The inverter 54 transfers electric power between the battery 52 and the torque machine(s) 40 in response to commands from the inverter module 66, which is signally connected to controller 60. The high-voltage electrical system 50 include suitable devices for monitoring electric power flow including current and voltage monitoring systems. The battery 52 can be any suitable high-voltage electrical energy storage device, e.g., a high-voltage battery, and preferably includes a monitoring system that provides a measure of electrical power supplied to the high-voltage bus, including voltage and electric current.

The battery 52 couples to the inverter 54 via a high voltage bus that preferably include a contactor switch that permits or prohibits flow of electric current between the battery 52 and the inverter 54. The inverter 54 preferably includes a plurality of electric power inverters, each including complementary multi-phase power electronics devices including a plurality of insulated gate bipolar transistors for converting DC power from the battery to AC power for powering one of the torque machines 40 by switching at high frequencies. The insulated gate bipolar transistors form a switch mode power supply configured to receive control commands. The inverter module 66 includes respective motor control modules that are configured to receive torque commands and control states of the insulated gate bipolar transistors are controlled to provide motor drive mechanical power generation or electric power regeneration functionality. The three-phase inverters receive or supply DC electric power via DC transfer conductors and transform DC power to or from three-phase AC power, which is conducted to or from the torque machine(s) 40 for operation as motors or generators via transfer conductors. The inverter 54 transfers electrical power to and from the torque machine(s) 40 in response to the motor torque commands. Electrical current is transmitted across the high-voltage bus to charge and discharge the battery 52.

A user interface 13 is preferably signally connected to a plurality of devices through which a vehicle operator directs and commands operation of the powertrain system. The commands preferably include an accelerator pedal command 112, brake pedal command 113, transmission range command 114, vehicle speed cruise control command 115, and clutch pedal command 116 when the transmission 20 is configured as a manual transmission. The transmission range command 114 may have a discrete number of operator-selectable positions (PRNDL). Alternatively, the transmission range command 114 may include a gear shift pattern including a plurality of operator-selectable forward and reverse gears. The user interface 13 may include a single device, as shown, or alternatively may include a plurality of user interface devices directly connected to individual control modules. Operator inputs preferably including an output torque request determined via the accelerator pedal command 112, brake pedal command 113 and vehicle speed cruise control command 115, and a selected transmission range determined via the transmission range command 114.

The controller 60 signally and operatively links to various actuators and sensors in the powertrain system via communications link 65 to monitor and control operation of the powertrain system, including synthesizing information and inputs, and executing routines to control actuators to meet control objectives related to fuel economy, emissions, performance, drivability, and protection of hardware, including batteries of battery and the torque machine(s) 40. The controller 60 is a subset of an overall vehicle control architecture, and provides coordinated system control of the powertrain system, including supervisory control of the ECM 62, the TCM 64, and the inverter module 66.

The aforementioned control modules communicate with other control modules, sensors, and actuators via the communications link 65, which effects structured communication between the various control modules. The specific communication protocol is application-specific. The communications link 65 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
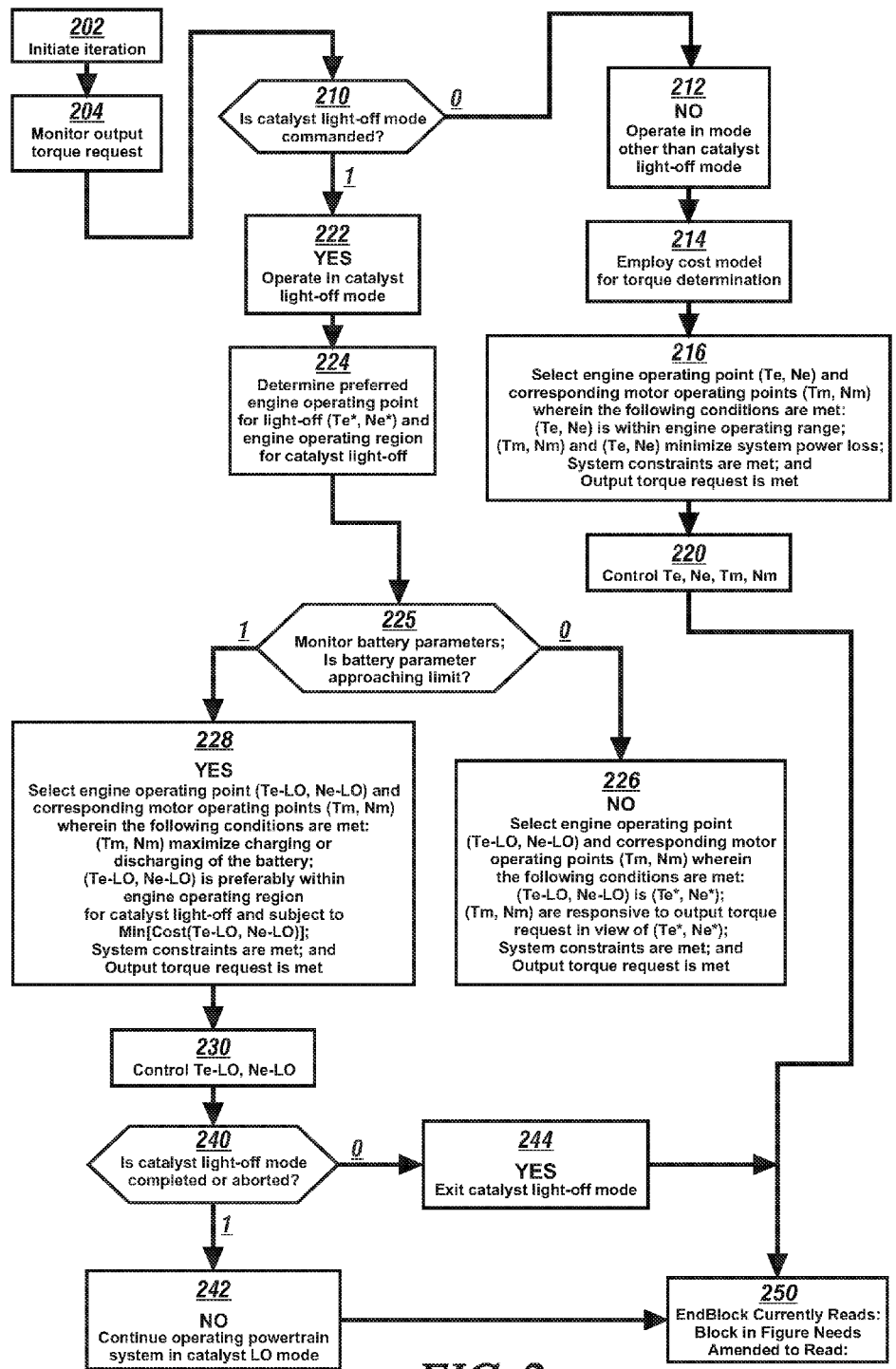
FIG. 2 schematically shows a process in flowchart form for controlling a multi-mode powertrain system including non-combustion torque machine(s) and an internal combustion engine fluidly coupled to an exhaust aftertreatment system including a catalytic device, in accordance with the disclosure.

FIG. 2 schematically shows a process 200 in flowchart form for controlling a multi-mode powertrain system including a non-combustion torque machine and an internal combustion engine fluidly coupled to an exhaust aftertreatment system including a catalytic device. Embodiments of the multi-mode powertrain system are described with reference to FIG. 1. The process includes selecting an engine operating point in response to a command to effect light-off in the catalytic device, with the engine operating within an engine operating region for catalyst light-off that minimizes costs associated with operating the engine. A corresponding torque command for the non-combustion torque machine is determined that is responsive to an output torque request. Operation of the engine is controlled in a catalyst light-off mode in response to the selected engine operating point and operation of the non-combustion torque machine is controlled in response to the corresponding torque command. Table 1 is provided as a key to FIG. 2 wherein the numerically labeled blocks and the corresponding functions are set forth as follows.

TABLE 1

| BLOCK | BLOCK CONTENTS |
|---|---|
| 202 | Initiate iteration |
| 204 | Monitor output torque request |
| 210 | Is catalyst light-off mode commanded ? |
| 212 | NO - Operate in mode other than catalyst light-off mode |
| 214 | Employ cost model for torque determination |
| 216 | Select engine operating point (Te, Ne) and corresponding motor operating points (Tm, Nm) wherein the following conditions are met: engine operating point (Te, Ne) is within engine operating range; |

TABLE 1-continued

| BLOCK | BLOCK CONTENTS |
|---|---|
| | motor operating points (Tm, Nm) and engine operating point (Te, Ne) minimize system power loss (cost); system constraints are met; and output torque request is met |
| 220 | Control Te, Ne, Tm, Nm |
| 222 | YES - Operate in catalyst light-off mode |
| 224 | Determining preferred engine operating point for light-off (Te*, Ne*) and engine operating region for catalyst light-off |
| 225 | Monitor battery parameters; Is battery parameter approaching limit? |
| 226 | NO - Select engine operating point (Te-LO, Ne-LO) and corresponding motor operating points (Tm, Nm) wherein the following conditions are met: engine operating point (Te-LO, Ne-LO) is preferred engine operating point (Te*, Ne*); motor operating points (Tm, Nm) are responsive to output torque request in view of preferred engine operating point (Te*, Ne*); system constraints are met; output torque request is met |
| 228 | YES - Select engine operating point (Te-LO, Ne-LO) and corresponding motor operating points (Tm, Nm) wherein the following conditions are met: motor operating points (Tm, Nm) maximize charging or minimize discharging of the battery; engine operating point (Te-LO, Ne-LO) is preferably within engine operating region for catalyst light-off and subject to Min[Cost(Te-LO, Ne-LO)]; system constraints are met; output torque request is met |
| 230 | Control Te-LO, Ne-LO |
| 240 | Is catalyst light-off mode completed or aborted? |
| 242 | NO - Continue operating powertrain system in catalyst LO mode |
| 244 | YES - Exit catalyst light-off mode |
| 250 | End |

The process 200 regularly and periodically executes to facilitate and control operation of the torque actuators of the powertrain system 100, including operating the powertrain system 100 in a catalyst light-off mode.

Figures 1, 3:
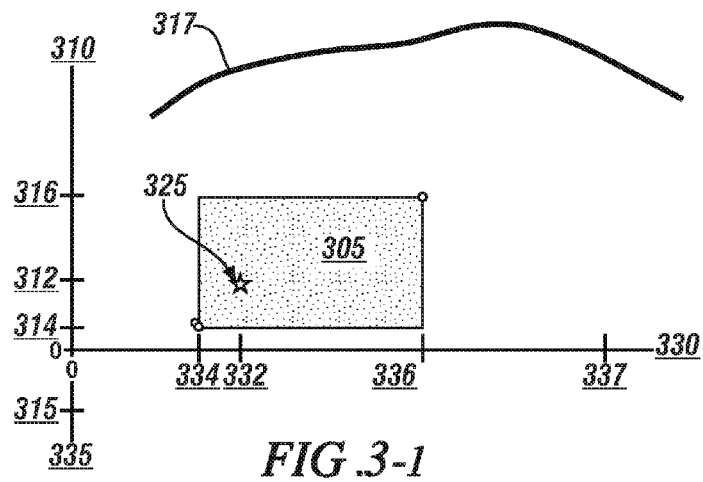
Figures 2, 3:
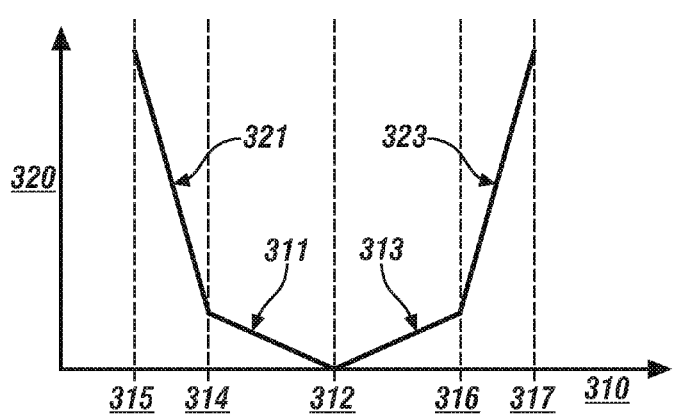
Figure 3:
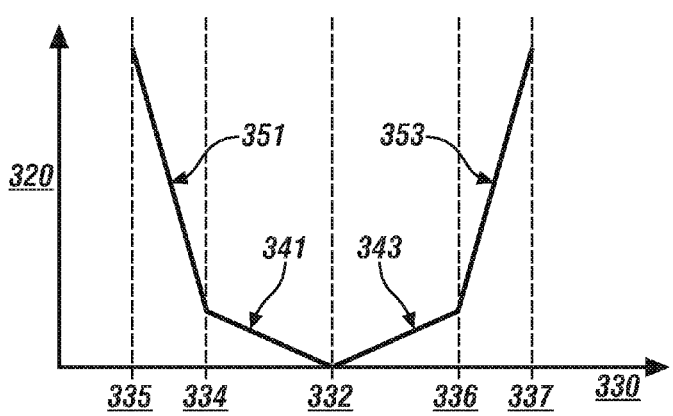

A present iteration of the process is initiated (202), including monitoring an output torque request (204), and determining whether a catalyst light-off mode is commanded (210). The catalyst light-off mode may be commanded upon initiating vehicle operation, or in conjunction with a command to autostart the engine during ongoing vehicle operation. A catalyst light-off mode may be commanded based upon a determination that an operating temperature of the catalytic device 15 has decreased to less than a light-off temperature, with such determination based upon output from direct temperature monitoring or output from a catalyst thermal model. When a catalyst light-off mode is commanded (210)(1), operation in the catalyst light-off mode commences (222). This includes determining a preferred engine operating point for catalyst light-off (Te*, Ne*) and an engine operating region for catalyst light-off (224), described herein with reference to FIG. 3-1. FIG. 3-1 graphically shows engine operating ranges of speed and load, including depicting one embodiment of an engine operating region for catalyst light-off 305. The engine operating region for catalyst light-off 305 includes the preferred engine operating point for catalyst light-off 325, which includes a preferred engine speed Ne* 332 and a preferred engine torque Te* 312. The preferred engine operating point 325 shown with reference to FIG. 3-1 is selected to provide an exhaust gas feedstream that achieves rapid light-off of the catalytic device 15 while minimizing untreated emissions while operating in the catalyst light-off mode for an embodiment of the powertrain system 100. The engine operating region for catalyst light-off 305 defines and encompasses a region of allowable engine operating points to effect catalyst light-off that includes an allowance for adjusting engine operation to increase battery charging effort (when an associated battery parameter is decreasing) and an allowance for adjusting engine operation to increase battery discharging effort (when the associated battery parameter is increasing).

Battery parameters including a state-of-charge (SOC) of the battery 52 are monitored to determine when one of the battery parameters is approaching a limit (225). Operating in the catalyst light-off mode requires awareness of the battery parameters, including relation of the battery parameters to battery limits. By way of example for purposes of illustration, the battery parameters may include the SOC, and exemplary battery limits associated with the SOC may include a maximum SOC of 60% and a minimum SOC of 40% when the battery 52 is a lithium-based device. When it is indicated that one of the monitored battery parameters is approaching one of the battery limits (225)(1), the battery parameter is considered in determining the motor operating points (Tm, Nm) and the engine operating point for light-off (Te-LO, Ne-LO) (228). As used herein, the monitored battery parameter is considered approaching one of the battery limits when it is within a predetermined range of or distance from the limit, has a rate of change indicating an incipient violation of the limit, or a combination thereof. For example, a battery parameter of SOC may be considered approaching a limit SOC when it is within 2% SOC away from the limit. As another example, a battery parameter of SOC may be considered approaching a limit SOC when the rate-of-change of SOC exceeds a predetermined rate-of-change of SOC. The predetermined rate-of-change may be a static value or may be a value which is determined as a function of the distance of SOC from the limit SOC, wherein the further away from the limit the SOC is the greater the predetermined rate-of-change may be. An exemplary system may experience such an operating condition when operating in the catalyst light-off mode while ascending a hill. Otherwise (225)(0), the battery parameter is not considered in determining the torque commands while operating in the catalyst light-off mode (226).

The engine operating point for light-off (Te-LO, Ne-LO) and corresponding motor operating points (Tm, Nm) are determined as follows while operating in the catalyst light-off mode when the battery parameter is not approaching a limit (226). The torque management scheme determines operating points for the engine 10 and the non-combustion torque machine(s) 40 in response to the output torque request, including selecting the engine operating point (Te-LO, Ne-LO) at or near the preferred engine operating point for catalyst light-off (Te*, Ne*) 325, and determining corresponding torque command(s) for the non-combustion torque machine(s) 40 that are responsive to the output torque request while only taking into account and minimizing costs associated with engine operation. Costs associated with operating the non-combustion torque machine(s) 40 are not considered during operation in the catalyst light-off mode. The selection of the engine operating point at or near the preferred engine operating point 325 is subject to constraints. The constraints include requiring the combination of torque outputs from the engine 10 and the non-combustion torque machine(s) 40 to be responsive to the output torque request, requiring the powertrain system operate within the constraints associated with the battery 52 and non-combustion torque machine(s) 40, and controlling engine operation so the engine operating point in terms of both speed and load is at a minimum cost as determined using the engine operating cost 320 described with reference to the preferred engine operating point and the engine operating region for catalyst light-off 305 described in FIGS. 3-1, 3-2, and 3-3. Thus, the engine operating point for light-off (Te-LO, Ne-LO) and corresponding motor operating points (Tm, Nm) are determined so that the engine operating point for light-off (Te-LO, Ne-LO) is within the engine operating region for catalyst light-off and minimized with regard to engine operating costs. The motor operating points (Tm, Nm) are selected to be responsive to the engine operating point for light-off (Te-LO, Ne-LO) and the output torque request when all system constraints are met.

One constraint associated with operating in the light-off mode includes a requirement that a combination of torque outputs from the engine and the non-combustion torque machine(s) 40 be responsive to the output torque request. When operating in a fixed-gear mode, the respective torque outputs are additive, and the additive combination of the torque outputs from the engine 10 and the non-combustion torque machine(s) 40 are controlled to achieve the output torque request. When operating in a continuously variable mode, the respective torque outputs may be combined using matrix relationships that account for other effects, with the matrixed combination of the torque outputs from the engine and the non-combustion torque machine(s) 40 controlled to achieve the output torque request.

Another constraint associated with operating in the light-off mode includes a requirement that the powertrain system operate within the constraints associated with the battery 52 and non-combustion torque machine(s) 40, i.e., within minimum and maximum power limits for the battery 52 and within minimum and maximum torque and speed limits for the non-combustion torque machine(s) 40. The aforementioned power limits for the battery 52, e.g., SOC, cannot be violated without damaging the battery 52 and thus affecting its service life. The minimum and maximum torque and speed limits for the non-combustion torque machine(s) 40 are inviolable in that the torque machine(s) 40 are incapable of operating outside the limits. Thus, during ongoing operation the torque management scheme controls the torque commands for the engine 10 and the non-combustion torque machine(s) 40 in response to the output torque request while continuing to operate in the catalyst light-off mode only so long as the constraints associated with the battery 52 and non-combustion torque machine(s) 40 are not violated. This operation includes accounting for any changes in the SOC of the battery 52 and the output torque request. As described herein, engine output torque and/or speed can be adjusted towards torque or speed limits in response to changes in the output torque request while continuing to operate in the catalyst light-off mode.

Another constraint associated with operating in the light-off mode includes controlling engine operation so the engine operating point in terms of both speed and load is at a minimum cost as determined using the light-off mode operating cost 320 described with reference to the preferred engine operating point and an engine operating region for catalyst light-off 305 described in FIGS. 3-1, 3-2, and 3-3.

FIGS. 3-1, 3-2, and 3-3 graphically show a preferred range of allowable engine operating points and associated engine operating costs to effect catalyst light-off in relation to engine operating costs. FIG. 3-1 includes engine speed (RPM) 330 on the horizontal axis and engine torque (Te) 310 on the vertical axis, and graphically shows ranges of engine operation including a minimum engine torque 315 (drag), a maximum engine torque 317, a minimum engine speed 335, (depicted as 0 RPM, but may instead be idle speed) and a maximum engine speed 337 (redline). The engine operating region for catalyst light-off 305 includes the preferred engine operating point 325, including the preferred engine speed Ne* 332 and the preferred engine torque Te* 312. The preferred engine operating point 325 is an engine operating point that provides an exhaust gas feedstream that achieves rapid light-off of the catalytic device 15 while minimizing untreated emissions during operation in the light-off mode. In one embodiment this may include relatively low engine power output for an extended period of time, and using the non-combustion torque machine(s) 40 to sink or source additional required mechanical power as supplied from the battery 52. Thus, powertrain system operation is controlled within minimum and maximum power limits for the battery 52 and within minimum and maximum torque and speed limits for the non-combustion torque machine(s) 40. The engine operating region for catalyst light-off 305 is circumscribed by a minimum allowable engine torque (Te-min) 314, a maximum allowable engine torque (Te-max) 316, a minimum allowable engine speed (Ne-min) 334 and a maximum allowable engine speed (Ne-max) 336. The engine operating region for catalyst light-off 305 permits an extended range of powertrain operation in the catalyst light-off mode, thus increasing the likelihood of effecting catalyst light-off during a driving cycle. Engine operation is permissible outside the speeds and torques associated with the engine operating region for catalyst light-off 305, but engine operation in the catalyst light-off mode is disabled when so operating.

FIG. 3-2 graphically shows engine torque (Te) 310 on the horizontal axis in relation to engine operating costs 320 on the vertical axis, with the aforementioned engine torques including the minimum and maximum engine torques 315 and 317, respectively. FIG. 3-2 also shows the engine operating region for catalyst light-off 305 vis-à-vis the corresponding minimum and maximum allowable engine torques 314 and 316, respectively. The preferred engine torque for light-off (Te-LO) 312 is also shown. The engine operating costs include allowable light-off cost lines 311 and 313, and cost lines 321 and 323. As shown, the engine operating costs 320 increase significantly for engine operation outside the engine operating region for catalyst light-off 305 as partially defined by minimum and maximum allowable engine torques 314 and 316, thus discouraging engine operation at torque levels outside the minimum and maximum allowable engine torques 314 and 316 of the engine operating region for catalyst light-off 305 during operation in the catalyst light-off mode.

FIG. 3-3 graphically shows engine speed (Ne) 330 on the horizontal axis in relation to engine operating cost 320 on the vertical axis, with the aforementioned engine speeds including the minimum and maximum engine speed 335 and 337, respectively. FIG. 3-3 also shows the engine operating region for catalyst light-off 305 vis-à-vis the corresponding minimum and maximum allowable engine speeds 334 and 336, respectively. The preferred engine speed for light-off (Ne-LO) 332 is also shown. The engine operating costs include allowable light-off cost lines 341 and 343, and cost lines 351 and 353. As shown, the engine operating costs 320 increase significantly for engine operation outside the engine operating region for catalyst light-off 305 as partially defined by minimum and maximum allowable engine speeds 334 and 336, thus discouraging engine operation at speeds that are outside the minimum and maximum allowable engine speeds 334 and 336 of the engine operating region for catalyst light-off 305 during operation in the catalyst light-off mode.

The engine operating point for light-off (Te-LO, Ne-LO) and corresponding motor operating points (Tm, Nm) are determined as follows while operating in the catalyst light-off mode when the battery parameter is approaching a limit (228). The battery parameter is considered to be approaching a limit when the battery parameter is proximal to one of the constraints or when a rate-of-change in the monitored battery parameter indicates an incipient violation of one of the constraints as previously discussed. A torque management scheme is employed to determine operating points for the engine 10 and the non-combustion torque machine(s) 40 while managing or otherwise responding to one or more battery parameters, e.g., the SOC. This includes selecting motor operating points (Tm, Nm) that maximize charging or discharging of the battery to rapidly adjust or manage battery SOC. An engine operating point for the light-off (Te-LO, Ne-LO) is determined that is preferably within engine operating region for catalyst light-off 305 and is subject to minimum cost constraints Min[Cost(Te-LO, Ne-LO)]. FIGS. 3-2 and 3-3 depict the cost constraints for the engine when operating in the light-off mode.

The motor operating points (Tm, Nm) and the engine operating point for light-off (Te-LO, Ne-LO) are subject to meeting the output torque request and all the aforementioned system constraints while minimizing engine operating costs, i.e., Min[Cost(Te-LO, Ne-LO)]. Thus, an engine operating point can be selected that is within the engine operating region for catalyst light-off 305 but adjusted away from the preferred engine operating point 325 to effect charging of the battery 52 to increase a state-of-charge of the battery 52. Alternatively, an engine operating point can be selected that is within the engine operating region for catalyst light-off 305 but adjusted away from the preferred engine operating point 325 to effect discharging of the battery 52 to decrease a state-of-charge of the battery 52.

The powertrain system operates using the engine operating point for light-off (Te-LO, Ne-LO) to control the engine and the non-combustion torque machine(s) 40 (Tm) (230). Thus, powertrain system operation is controlled in a manner that permits engine operation in the light-off mode and controls operation of the non-combustion torque machine(s) 40 within minimum and maximum power limits for the battery 52 and within minimum and maximum torque and speed limits for the non-combustion torque machine(s) 40.

It is determined whether the catalyst light-off mode has completed execution, i.e., whether temperature of the catalyst device 15 has achieved a predetermined threshold, or if operation in the catalyst light-off mode has been aborted due to a system fault, or due to a change in operating conditions (240). So long as the catalyst light-off mode is commanded, and has not completed execution or been aborted (240)(0), operation in the catalyst light-off mode is permitted (242), and this iteration of the process 200 ends (250). When the catalyst light-off mode is has completed execution or has been aborted (240)(1), operation in the catalyst light-off mode is discontinued (244), and this iteration of the process 200 ends (250).

When the catalyst light-off mode is not commanded (210) (0), the engine operates in a non-catalyst light-off mode (212), including employing a total power cost function (214) torque management scheme to determine operating points for the engine 10 and the non-combustion torque machine(s) 40 that are responsive to the output torque request while minimizing costs associated with operating the powertrain system including powertrain system operating costs, i.e., costs associated with operating the engine and costs associated with operating non-combustion torque machine(s) 40 (216).

An exemplary engine operating cost function is shown graphically with reference to FIG. 4 and an analytic framework for determining the powertrain system operating costs is described and shown with reference to FIG. 5. Constraints include a requirement that a combination of torque outputs from the engine and the non-combustion torque machine(s) 40 be responsive to the output torque request and a requirement that the powertrain system operate within the constraints associated with the battery 52 and non-combustion torque machine(s) 40, i.e., within minimum and maximum power limits for the battery 52 and within minimum and maximum torque and speed limits for the non-combustion torque machine(s) 40. The powertrain system operates using the selected engine operating points to control the engine (Te) and the non-combustion torque machine(s) 40 (Tm) (220) and this iteration of the process 200 ends (250).

FIG. 4 graphically illustrates a three-dimensional engine cost function 415 for an embodiment of the internal combustion engine analogous to the engine 10 of the multi-mode powertrain system 100 of FIG. 1. The cost function 415 is shown with engine operating cost 420 on a first axis in relation to engine speed 430 on a second axis and engine torque 410 on a third axis. As indicated, the cost increases with increasing speed and torque. A preferred engine operating point 425 is shown, and indicates an engine speed/load operating point at which the engine operating cost 420 is minimized. The preferred engine operating point 425 corresponds to the aforementioned preferred engine operating point 325. The three-dimensional cost function 415 is illustrative, and does not represent actual data from an exemplary powertrain system.

FIG. 5 schematically illustrates an analytic framework for determining the powertrain system operating costs for an exemplary power cost function 500, which is described with reference to the multi-mode powertrain system 100 of FIG. 1. Powertrain elements include engine 10, transmission 20, non-combustion torque machine(s) 40, battery 52, inverter 54, wheel brakes 98, driveline 90, and a fuel storage system 8. Pseudo-elements include an inertial load 17, which is an element constructed to account for system inertias, and high-voltage electrical load 56, which is an element constructed to account for high-voltage loads in the vehicle outside that load used for the powertrain system 100. Power flow paths include a first power flow path 9 from the fuel storage system 8 to transfer fuel power to the engine 10, a second power flow path 19 between the engine 10 and the transmission 20, and third power flow path 53 between the battery 52 and the inverter 54, a fourth power flow path 57 between the inverter 54 and the high-voltage electrical load 56, and fifth power flow path 59 between the inverter 54 and the non-combustion torque machine(s) 40, a sixth power flow path 23 between the non-combustion torque machine(s) 40 and the transmission 20, and seventh power flow path 25 between the inertial load 17 and the transmission 20, an eighth power flow path 88 between the transmission and the wheel brakes 98, and a ninth power flow path 99 between the wheel brakes and the driveline 90. Power losses include engine power losses 11, battery power losses 55, mechanical power losses 87, electric motor losses 89, and brake power losses 97. The power cost inputs to the power cost function 500 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 11, electric motor power losses 89, battery power losses 55, brake power losses 97, and mechanical power losses 87 associated with operating the multi-mode powertrain at specific operating points for the engine 10 and the non-combustion torque machine(s) 40. The power cost function 500 may be employed to determine a powertrain system operating cost for operating at a selected engine operating point over the range of engine operation.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control module implemented method for effecting light-off of a catalytic device in an exhaust aftertreatment system fluidly coupled to an internal combustion engine of a multi-mode vehicular powertrain system including an electric machine electrically coupled to a battery, the method comprising:
   monitoring a user interface and determining, by processor, an output torque request for the multi-mode vehicular powertrain system;
   determining, by a processor, a preferred engine operating point having a minimum engine operating cost within a predetermined engine operating region for catalyst light-off; and
   when a state-of-charge of the battery is not approaching a predetermined state-of-charge limit, the control module:
      controlling operation of the internal combustion engine to the preferred engine operating point; and
      controlling operation of the electric machine to a machine operating point wherein a-combination of engine torque at the preferred engine operating point and electric machine torque at the machine operating point satisfies the output torque request;
   when a state-of-charge of the battery is approaching the predetermined state-of-charge limit, the control module:
      controlling operation of the electric machine to a machine operating point corresponding to a maximum battery power flow; and
      controlling operation of the internal combustion engine to an engine operating point adjusted away from the preferred engine operating point based on achieving a desired state-of-charge of the battery, wherein the combination of engine torque at said engine operating point and electric machine torque at the machine operating point satisfies the output torque request.

2. The method of claim 1, wherein the method is performed subsequent to an autostart of the internal combustion engine during ongoing vehicle operation.

3. The method of claim 1, wherein the method is performed in response to an operating temperature of the catalytic device decreasing to less than a light-off temperature.

4. A control module implemented method for controlling a multi-mode vehicular powertrain system including an internal combustion engine fluidly coupled to an exhaust aftertreatment system including a catalytic device, the method comprising:
   in response to a command to light-off the catalytic device:
      selecting, by a processor, an engine operating point within an engine operating region for catalyst light-off that is adjusted away from a preferred engine operating point based on achieving a desired state-of-charge of a high-voltage battery to minimize engine operating costs;
      determining corresponding torque commands for non-combustion torque machines that are responsive to the output torque request that maximize power flow between a high-voltage battery and the non-combustion torque machines when a state-of-charge parameter of the high-voltage battery approaches a limit; and
      controlling, by a control module, operation of the internal combustion engine in response to the selected engine operating point and controlling operation of the non-combustion torque machines in response to the corresponding torque commands.

5. The method of claim 4, wherein selecting an engine operating point within the engine operating region for catalyst light-off that only minimizes engine operating costs when the state-of-charge parameter of the high-voltage battery approaches said limits comprises selecting an engine operating point that is within the engine operating region for catalyst light-off adjusted away from a preferred engine operating point for catalyst light-off to effect charging of the non-combustion power system to increase magnitude of the state-of-charge parameter, wherein the preferred engine operating point comprises a preferred engine speed and a preferred engine load.

6. The method of claim 4, wherein selecting an engine operating point within the engine operating region for catalyst light-off that only minimizes engine operating costs when the state-of-charge parameter of the high-voltage battery approaches said limits comprises selecting an engine operating point that is within the engine operating region for catalyst light-off adjusted away from a preferred engine operating point for catalyst light-off to effect discharging of the non-combustion power system to decrease magnitude of the state-of-charge parameter, wherein the preferred engine operating point comprises a preferred engine speed and a preferred engine load.

7. The method of claim 4, wherein the command to light-off the catalytic device comprises commanding operating in a catalyst light-off mode in conjunction with a command to autostart the internal combustion engine during ongoing vehicle operation.

8. The method of claim 4, wherein the command to light-off the catalytic device comprises commanding operating in a catalyst light-off mode based upon a determination that an operating temperature of the catalytic device has decreased to less than a light-off temperature.

* * * * *